(12) United States Patent
Liu et al.

(10) Patent No.: US 10,384,746 B2
(45) Date of Patent: Aug. 20, 2019

(54) INNOVATIVE BOOSTER TO INCREASE THE FINAL PENETRATION DEPTH OF GRAVITY INSTALLED PLATE ANCHOR

(71) Applicant: Dalian University of Technology, Dalian, Liaoning Province (CN)

(72) Inventors: Jun Liu, Dalian (CN); Congcong Han, Dalian (CN); Yuxia Hu, Dalian (CN)

(73) Assignee: Dalian University of Technology, Liaoning (CN)

( * ) Notice: Subject to any disclaimer, the term of this patent is extended or adjusted under 35 U.S.C. 154(b) by 0 days.

(21) Appl. No.: 15/776,954

(22) PCT Filed: Apr. 10, 2017

(86) PCT No.: PCT/CN2017/079918
§ 371 (c)(1),
(2) Date: May 17, 2018

(87) PCT Pub. No.: WO2018/028228
PCT Pub. Date: Feb. 15, 2018

(65) Prior Publication Data
US 2018/0346074 A1 Dec. 6, 2018

(30) Foreign Application Priority Data
Aug. 9, 2016 (CN) .......................... 2016 1 0648708

(51) Int. Cl.
*B63B 21/26* (2006.01)

(52) U.S. Cl.
CPC ........ *B63B 21/26* (2013.01); *B63B 2021/265* (2013.01); *Y02P 20/124* (2015.11)

(58) Field of Classification Search
CPC .......................... B63B 21/26; B63B 2021/265
See application file for complete search history.

(56) References Cited

U.S. PATENT DOCUMENTS

| | | | |
|---|---|---|---|
| 6,598,555 B1 * | 7/2003 | Bruce ..................... | B63B 21/26 114/294 |
| 6,941,885 B2 * | 9/2005 | Zimmerman .......... | B63B 21/26 114/294 |

(Continued)

FOREIGN PATENT DOCUMENTS

| CN | 102602506 A | 7/2012 |
|---|---|---|
| CN | 102700682 A | 10/2012 |

(Continued)

*Primary Examiner* — Anthony D Wiest
(74) *Attorney, Agent, or Firm* — Muncy, Geissler, Olds & Lowe, P.C.

(57) ABSTRACT

An anchor booster is designed to increase the final penetration depth of the gravity installed plate anchor. Moreover, the booster can also improve the directional stability of the gravity installed plate anchor during its free fall in water. After installation, the booster is retrieved by pulling its retrieval line up and can be used for the subsequent installation. The booster is comprised of a cylindrical shaft with three rear fins. The shaft is designed with an ellipsoidal tip and a contracted rear. The shaft rear is set with three slots thus the rear fins can be inserted into the slots to improve the directional stability of the hybrid anchor (i.e. the gravity installed plate anchor with a booster). The booster tip is fabricated with a cylindrical slot and the anchor tail has a compatible bar, such that the booster can be connected to the anchor tail by a shear pin.

3 Claims, 4 Drawing Sheets

( Fig 1a as an illustration in Abstract)

(56) References Cited

U.S. PATENT DOCUMENTS

| | | | |
|---|---|---|---|
| 9,422,034 B2 * | 8/2016 | Bauer | B63B 21/26 |
| 2008/0141922 A1 * | 6/2008 | Muehlner | B63B 21/243 |
| | | | 114/294 |

FOREIGN PATENT DOCUMENTS

| | | |
|---|---|---|
| CN | 202896831 U | 4/2013 |
| CN | 106240748 A | 12/2016 |
| KR | 100459985 B1 | 12/2004 |

* cited by examiner ( Fig 1a as an illustration in Abstract)

INNOVATIVE BOOSTER TO INCREASE THE FINAL PENETRATION DEPTH OF GRAVITY INSTALLED PLATE ANCHOR

TECHNICAL FIELDS

The invention belongs to the field of the ocean engineering technology. The anchor booster in this invention is aiming at increasing the final penetration depth of the gravity installed plate anchor in seabed.

BACKGROUND

Description of Related Art

Offshore oil and gas exploration adventures into deeper waters with harsher environments due to the depletion of oil and gas fields in shallow waters. For deepwater mooring systems, the platforms floating in the seawater are secured by anchoring foundations embedded in the seabed through chains. The anchors are used to resist the uplift loading by its self-weight and the surrounding soil resistance. Typical anchors applied to deepwater mooring systems include suction caissons, drag anchors, suction embedded plate anchors, and the dynamically installed anchors (DIAs). The DIA is installed through free fall in water and then penetration into seabed by self-weight. Therefore, the DIA is a potential alternative to deepwater mooring systems.

Torpedo anchors and gravity installed plate anchors are two types of the DIAs. The anchor is firstly released to a predetermined height above the mudline. After the release, the anchor falls freely in water and accelerates under its gravity. The fall velocity at the mudline is termed the impact velocity. Then the anchor penetrates into the seabed by its total energy, which includes the potential energy from its self-weight and the kinetic energy from its impact velocity. The embedment depth from the anchor tip to the mudline is termed the anchor final penetration depth. After installation, the anchor embedded in seabed provides holding capacity by its self-weight and the surrounding soil resistance. Typical seabed clayey soils are normally consolidated (NC) or lightly over consolidated (LOC) soils that are characterized with linearly increasing strength with depth. Therefore, a deeper penetration depth results in a higher holding capacity for the anchor.

Previous studies associated with the penetration depth of DIAs are summarized as follows. O'Loughlin et al. conducted centrifuge tests in kaolin clay and indicated that the penetration depth for torpedo anchors with different geometries and aspect ratios were 2.1~2.9 times the anchor length with impact velocities of 12~29 m/s. Hossain et al summarized various field tests and indicated that the penetration depth for torpedo anchors were 1.5~2.4 times the anchor length. However, the penetration depths of torpedo anchors in calcareous silts were relatively lower, which were 0.96~1.40 times the anchor length with impact velocities of 15~22 m/s as reported by Hossain et al. For gravity installed plate anchors, the penetration depths were 1.18~2.00 times the anchor length in kaolin clay with impact velocities of 10.40~23.00 m/s, and were 1.14~1.46 times the anchor length in calcareous silts with impact velocities of 20.53~28.60 m/s. Zimmerman et al. reported 54 field tests for gravity installed plate anchor in the Gulf of Mexico, indicating that the anchor could penetrate to an average depth of 1.77 times the anchor length with an impact velocity of 19 m/s.

Technical Problems

It can be indicated from the above results that: (1) the impact velocity for the gravity installed plate anchor is relatively low due to its complex geometry and thus the large drag force; (2) the penetration depth for the gravity installed plate anchor is relatively low due to the large contact area between the anchor flukes and the surrounding soil; (3) the penetration depth for the gravity installed plate anchor in calcareous silts with high strength gradient is relatively low. The soil strength gradient, k, is the increase in undrained shear strength for 1 m increase in depth. For kaolin clay, the gradient k is usually 1 kPa/m, whereas the gradient k can reach as high as 3 kPa/m in calcareous silts. Therefore, the penetration depth of the gravity installed plate anchor is limited, especially in soils with high strength gradient, due to the large contact area between the anchor flukes and the surrounding soil. Hence it is with necessary to increase the penetration depth and thus the holding capacity of the gravity installed plate anchor.

Solutions

To overcome the aforementioned limitations and to increase the penetration depth, hence the holding capacity of the gravity installed plate anchor, an anchor booster is proposed in this invention. The booster is attached to the anchor tail during dynamic installation to increase the impact velocity and the final penetration depth of the gravity installed plate anchor. After installation, the anchor booster is retrieved for the subsequent anchor installation.

The anchor booster (2) in this invention is comprised of a cylindrical shaft (2a) and three rear fins (2b). The cylindrical shaft (2a), which has an ellipsoidal tip and a contracted rear, is designed with a streamlined profile to decrease the drag force during free fall in water and dynamic installation in seabed. The rear fins (2b) can be inserted into the slots which are separated by 120° in plane and are located at the booster rear to improve the directional stability of the hybrid anchor (i.e. the gravity installed plate anchor with a booster). The booster features a cylindrical slot (2c) at the booster tip, thus the compatible cylindrical bar (1a) at the tail of the gravity installed plate anchor (1) can be inserted into the cylindrical slot (2c). A retrieval line is attached to the tail of the booster (2). After the installation, the anchor booster (2) is retrieved by pulling its retrieval line up, during which the shear pin (3) is broken off and the gravity installed plate anchor (1) is left to remain in seabed.

The procedures of the booster (2) to increase the final penetration depth of the gravity installed plate anchor (1) are summarized as follows:

(a) Insert the cylindrical bar of the gravity installed plate anchor into the slot located at the tip of the booster. Then fix the gravity installed plate anchor and the booster together by a shear pin. Note the shaft center of the gravity installed plate anchor must be in line with the shaft center of the booster to improve the directional stability of the hybrid anchor.

(b) The terminal velocity of the gravity installed plate anchor is increased by adding a booster. For anchor free fall in water, the terminal velocities for the gravity installed plate anchor and the hybrid anchor can be expressed by equations (1) and (2), respectively.

$$V_T = \sqrt{\frac{(m_A - \rho_w \Theta_A)g}{0.5 \rho_w A_p C_d}} \tag{1}$$

$$V'_T = \sqrt{\frac{(m_A + m_p - \rho_w(\Theta_A + \Theta_p))g}{0.5\rho_w A'_p C'_d}} \quad (2)$$

Where $V_T$, $m_A$, $\Theta_A$, $A_p$ and $C_d$ are the terminal velocity, mass, volume, frontal area and drag coefficient of the gravity installed plate anchor, $V'_T$, $A'_p$ and $C'_d$ are the terminal velocity, frontal area and drag coefficient of the hybrid anchor, $m_p$ and $\Theta_p$ are the mass and volume of the booster, $\rho_w$ is the water density and g is the gravitational acceleration. The frontal areas of $A_p$ and $A'_p$ are the anchor projected areas perpendicular to the anchor shaft. The terminal velocity of the hybrid anchor is increased due to the added weight provided by the booster.

(c) The final penetration depth of the gravity installed plate anchor is increased by adding the anchor booster. The equilibrium equations characterizing the dynamic installations of the gravity installed plate anchor and the hybrid anchor in seabed can be expressed by equations (3) and (4).

$$m_A \frac{d^2 z}{dt^2} = W_s - F_b - R_f(F_{bear} + F_{frict}) - F_d \quad (3)$$

$$(m_A + m_p)\frac{d^2 z}{dt^2} = W_s + W_p - F'_b - R_f(F'_{bear} + F'_{frict}) - F'_d \quad (4)$$

Where z is the penetration depth from the mudline to the anchor tip at the moment of t, $W_s$ and $W_p$ are the submerged weight of the gravity installed plate anchor and the booster in water, $F_b$, $F_{bear}$ and $F_{frict}$ are the soil buoyancy, soil end bearing resistance, soil frictional resistance on the gravity installed plate anchor, $F'_b$, $F'_{bear}$ and $F'_{frict}$ are the soil buoyancy, soil end bearing resistance, soil frictional resistance on the hybrid anchor. Both the kinetic and potential energies are increased with the addition of the booster, thus the final penetration depth of the gravity installed plate anchor is increased.

(d) After the installation of the hybrid anchor, the booster is retrieved by pulling its retrieval line up. When the uplift load is beyond the allowable force of the shear pin, the shear pin is broken off and the gravity installed plate anchor is left to remain in seabed. The booster can be re-used for the subsequent installation of the gravity installed plate anchor.

Advantages of the Invention

This invention relating to the anchor booster can improve both the directional stability and the impact velocity of the gravity installed plate anchor during its free fall in water. Moreover, with the addition of the kinetic energy and potential energy provided by the booster, the gravity installed plate anchor can penetrate deeper into the seabed. Compared to the existing technologies, the anchor booster is easy in manufacturing and cost effective. Though the installation cost is increased due to the transportation and retrieval process of the booster, the increased holding capacity of the gravity installed plate anchor aided by the booster has the potential to increase the safety factor or to reduce the total cost of the whole mooring system. This invention can be applied to deepwater seabed with varied soil strength profiles.

Figures 1A, 1B, 1C:
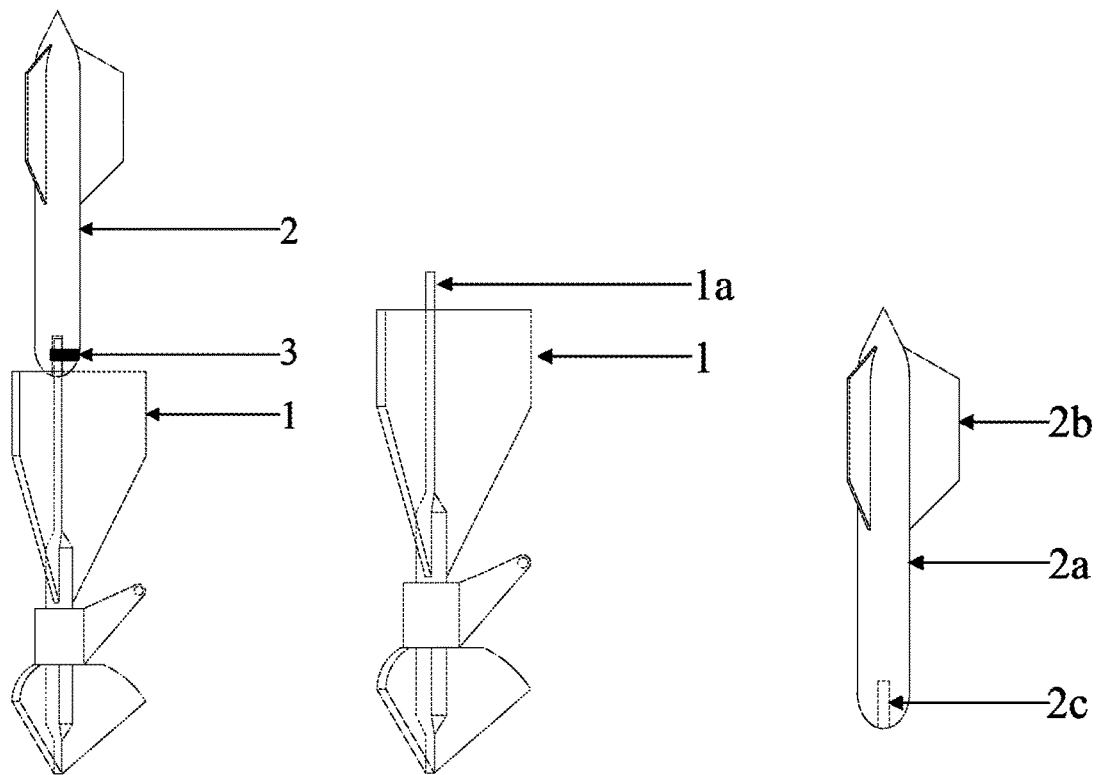
FIG. 1a The gravity installed plate anchor and its anchor booster that are connected together by a shear pin.
FIG. 1b Diagram of the gravity installed plate anchor.
FIG. 1c Diagram of the anchor booster in this invention.

1. The OMNI-Max anchor, 1a. The cylindrical bar located at the tail of the gravity installed plate anchor,
2. The anchor booster, 2a. The cylindrical shaft of the anchor booster, 2b. The rear fins of the anchor booster, 2c. The cylindrical slot located at the booster tip, and 3. The shear pin.

Installation and Retrieve of the Anchor Booster

The anchor booster is attached to the tail of the gravity installed plate anchor to increase the anchor impact velocity and the final penetration depth as shown in FIG. 1. After installation, the anchor booster can be retrieved for the subsequent installation. The processes of the installation and retrieve of the booster are shown in FIG. 2 and are summarized as follows.

(a) Insert the cylindrical bar of the gravity installed plate anchor into the slot located at the tip of the booster. Then fix the gravity installed plate anchor and the booster together by a shear pin. Note the shaft center of the gravity installed plate anchor must be in line with the shaft center of the booster to improve the directional stability of the hybrid anchor.

(b) The terminal velocity of the gravity installed plate anchor is increased by adding a booster. For anchor free fall in water, the terminal velocities for the gravity installed plate anchor and the hybrid anchor (i.e. the gravity installed plate anchor with a booster) can be expressed by equations (1) and (2), respectively.

$$V_T = \sqrt{\frac{(m_A - \rho_w \Theta_A)g}{0.5\rho_w A_p C_d}} \quad (1)$$

$$V'_T = \sqrt{\frac{(m_A + m_p - \rho_w(\Theta_A + \Theta_p))g}{0.5\rho_w A'_p C'_d}} \quad (2)$$

Where $V_T$, $m_A$, $\Theta_A$, $A_p$ and $C_d$ are the terminal velocity, mass, volume, frontal area and drag coefficient of the gravity installed plate anchor, $V'_T$, $A'_p$ and $C'_d$ are the terminal velocity, frontal area and drag coefficient of the hybrid anchor, $m_p$ and $\Theta_p$ are the mass and volume of the booster, $\rho_w$ is the water density and g is the gravitational acceleration. The frontal areas of $A_p$ and $A'_p$ are the anchor projected areas perpendicular to the anchor shaft. The terminal velocity of the hybrid anchor is increased due to the added weight provided by the booster.

(c) The final penetration depth of the gravity installed plate anchor is increased by adding the anchor booster. The equilibrium equations characterizing the dynamic installations of the gravity installed plate anchor and the hybrid anchor in seabed can be expressed by equations (3) and (4).

$$m_A \frac{d^2z}{dt^2} = W_s - F_b - R_f(F_{bear} + F_{frict}) - F_d \quad (3)$$

$$(m_A + m_p)\frac{d^2z}{dt^2} = W_s + W_p - F'_b - R_f(F'_{bear} + F'_{frict}) - F'_d \quad (4)$$

Where z is the penetration depth from the mudline to the anchor tip at the moment of t, $W_s$ and $W_p$ are the submerged weight of the gravity installed plate anchor and the booster in water, $F_b$, $F_{bear}$ and $F_{frict}$ are the soil buoyancy, soil end bearing resistance, soil frictional resistance on the gravity installed plate anchor, $F'_b$, $F'_{bear}$, and $F'_{frict}$ are the soil buoyancy, soil end bearing resistance, soil frictional resistance on the hybrid anchor. Both the kinetic and potential energies are increased with the addition of the booster, thus the final penetration depth of the gravity installed plate anchor is increased.

(d) After the installation of the hybrid anchor, the booster is retrieved by pulling its retrieval line up. When the uplift load is beyond the allowable force of the shear pin, the shear pin is broken off and the gravity installed plate anchor is left to remain in seabed. The anchor booster can be re-used for the next installation of the gravity installed plate anchor.

Detailed Description of the Anchor Booster

Figure 2:
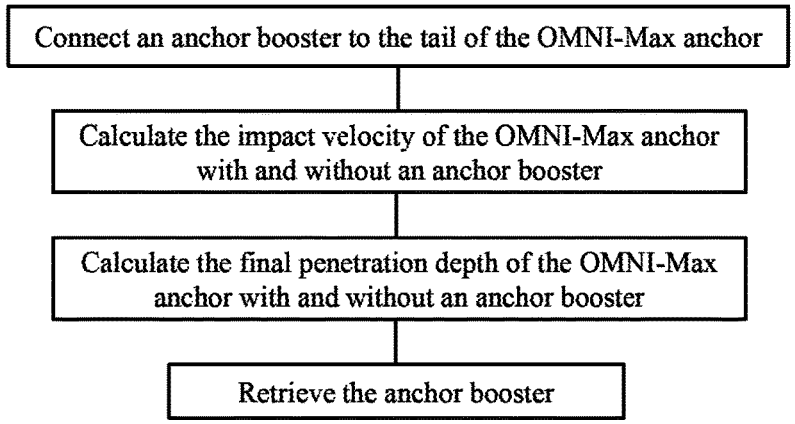
FIG. 2 Installation processes of the gravity installed plate anchor with an anchor booster.

FIGS. 1a, 1b and 1c show that the anchor booster (2), which is used to increase the final penetration depth of the gravity installed plate anchor (1), is comprised of a cylindrical shaft (2a) with three rear fins (2b). The cylindrical shaft (2a), which has an ellipsoidal tip and a contracted rear, is designed with a streamlined profile to decrease the drag force during free fall in water and dynamic installation in seabed. The rear fins (2b) can be inserted into the slots which are separated by 120° in plane and are located at the booster rear to improve the directional stability of the hybrid anchor. The booster features a cylindrical slot (2c) at the booster tip, thus the compatible cylindrical bar (la) at the tail of the gravity installed plate anchor (1) can be inserted into the cylindrical slot (2c). To improve the directional stability of the hybrid anchor, the rear fins (2b) attached to the booster rear can be enlarged. Hence the anchor release height and thus the impact velocity can be increased. A retrieval line is attached to the tail of the booster (2). After the installation, the booster (2) is retrieved by pulling the retrieval line up, during which the shear pin (3) is broken off and the gravity installed plate anchor (1) is left to remain in seabed.

Validation of the Working Efficiency of the Anchor Booster

In order to validate the working efficiency of the booster, experimental tests were carried out to investigate the effect of the booster on the terminal velocity of the gravity installed plate anchor, and numerical simulations were performed to investigate the effect of the booster on the final penetration depth of the gravity installed plate anchor. Moreover, a theoretical model was used to predict the final penetration depths in seabed of the gravity installed plate anchor and hybrid anchors.

I Working Efficiency of the Anchor Booster on the Impact Velocity of the Gravity Installed Plate Anchor The anchor free fall process in water can be divided into two stages: the accelerating stage and the steady stage. After the release, the anchor starts to accelerate in water. As the drag force is proportional to quadratic velocity, the anchor keeps constant velocity when the drag force on the anchor is equal to the anchor submerged weight. The final fall velocity is termed the terminal velocity, $V_T$, which can be expressed in equation (5).

$$V_T = \sqrt{\frac{(m_A - \rho_w \Theta_A)g}{0.5 \rho_w A_p C_d}} \quad (5)$$

Where $m_A$ is the anchor mass, $\rho_w$ is the water density, $\Theta_A$ is the anchor volume, g is the gravitational acceleration, $A_p$ is the anchor projected area perpendicular to the anchor shaft, $C_d$ is the drag coefficient, which is depended on the fluid dynamic viscosity, anchor size and anchor geometry.

Figure 3:
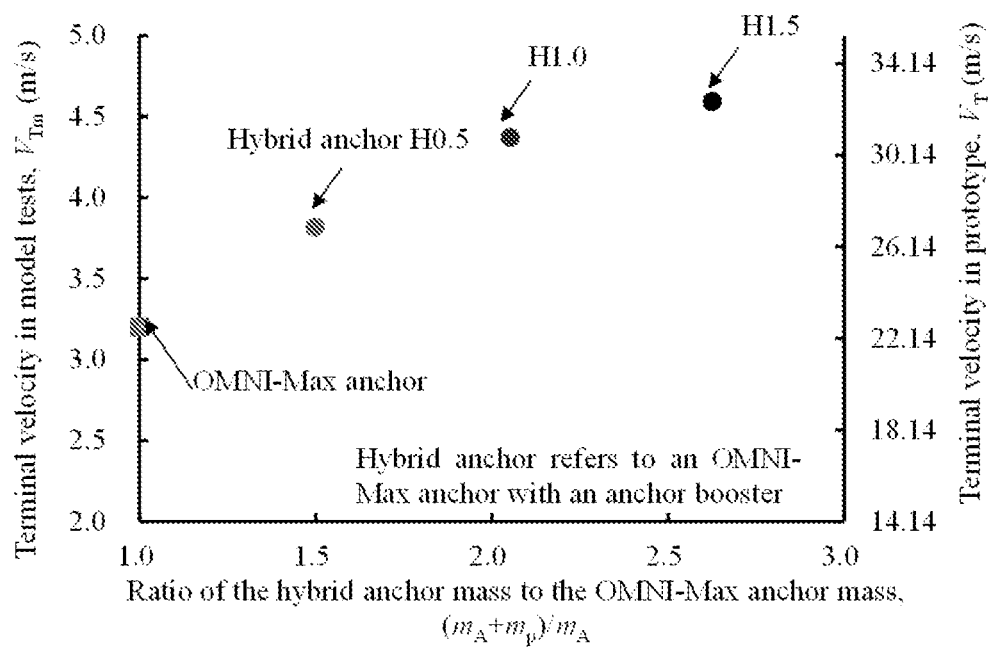
FIG. 3 Effect of the booster on the terminal velocity of the gravity installed plate anchor.

FIG. 3 illustrates the effect of the booster on the terminal velocity of the gravity installed plate anchor from free fall model tests. The terminal velocity for the gravity installed plate anchor is 22.63 m/s in prototype based on the similarity relationship. The hybrid anchor H0.5 means that the booster weight is approximately 0.5 times the anchor weight, and similarly to the H1.0 and H1.5. The terminal velocities are increased to 27.01 m/s, 30.9 m/s and 32.46 m/s for hybrid anchors H0.5, H1.0 and H1.5, respectively. This indicates that the kinetic energy of the gravity installed plate anchor exhibits an increase of 42%, 86% and 106%, respectively.

Figure 4:
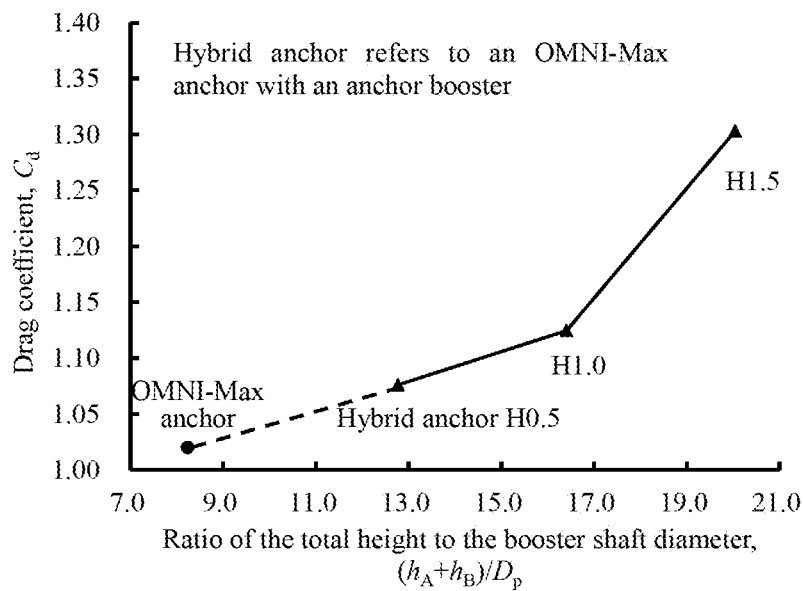
FIG. 4 Drag coefficients of the gravity installed plate anchor and hybrid anchors.

FIG. 4 depicts the drag coefficients for the gravity installed plate anchor and hybrid anchors. The drag coefficient for the gravity installed plate anchor is 1.02. The drag coefficients increase to 1.08, 1.12 and 1.30 for hybrid anchors H0.5, H1.0 and H1.5, respectively. It can be indicated that, the drag coefficient exhibits minor increase for the gravity installed plate anchor by adding a booster. Therefore, the anchor booster is indeed beneficial in increasing the anchor impact velocity and thus the kinetic energy during free fall in water.

II Working Efficiency of the Anchor Booster on the Final Penetration Depth of the Gravity Installed Plate Anchor (1) Numerical Simulating Results In order to investigate the working efficiency of the booster on the final penetration depth of the gravity installed plate anchor in seabed, numerical simulations based on the computational fluid dynamics (CFD) were performed. The impact velocity for the gravity installed plate anchor was considered as 20 m/s, the impact velocities for the hybrid anchors are considered as 20 m/s and 25 m/s, respectively. With the same impact velocity of 20 m/s, the effect of the booster weight on the final penetration depth of the gravity installed plate anchor is investigated. With the increased velocity of 25 m/s for hybrid anchors, the effect of the impact velocity on the final penetration depth of the gravity installed plate anchor is investigated.

Figure 5:
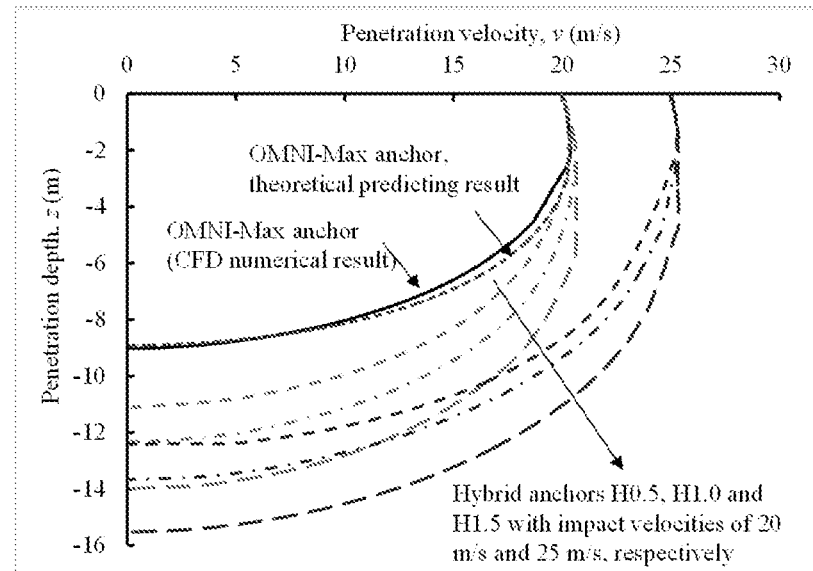
FIG. 5 Effect of the booster on the final penetration depth of the gravity installed plate anchor from numerical simulations.

The soil undrained shear strength $s_u$=2.4+3z kPa, and the coefficient of friction between the soil and the anchor was set as 1.0. Other parameters in the CFD numerical modeling were the same as that in the below theoretical model as listed in Table 1. FIG. 5 indicated that the final penetration depth of the gravity installed plate anchor is 9.01 m with an impact velocity of 20 m/s. With the same impact velocity, the final penetration depths are 11.09 m, 12.33 m and 13.99 m for hybrid anchors H0.5, H1.0 and H1.5, respectively. Compared to that of the gravity installed plate anchor, the final penetration depth experiences an increase of 23%, 37% and 55% for hybrid anchors of H0.5, H1.0 and H1.5, respectively. With the increased impact velocity of 25 m/s, the final penetration depths are 12.41 m, 13.66 m and 15.52 m for hybrid anchors H0.5, H1.0 and H1.5, respectively. Compared to that of the gravity installed plate anchor with the impact velocity of 20 m/s, the final penetration depth experiences an increase of 38%, 52% and 72% for hybrid anchors of H0.5, H1.0 and H1.5, respectively.

(2) Theoretical Calculating Results

Figure 6:
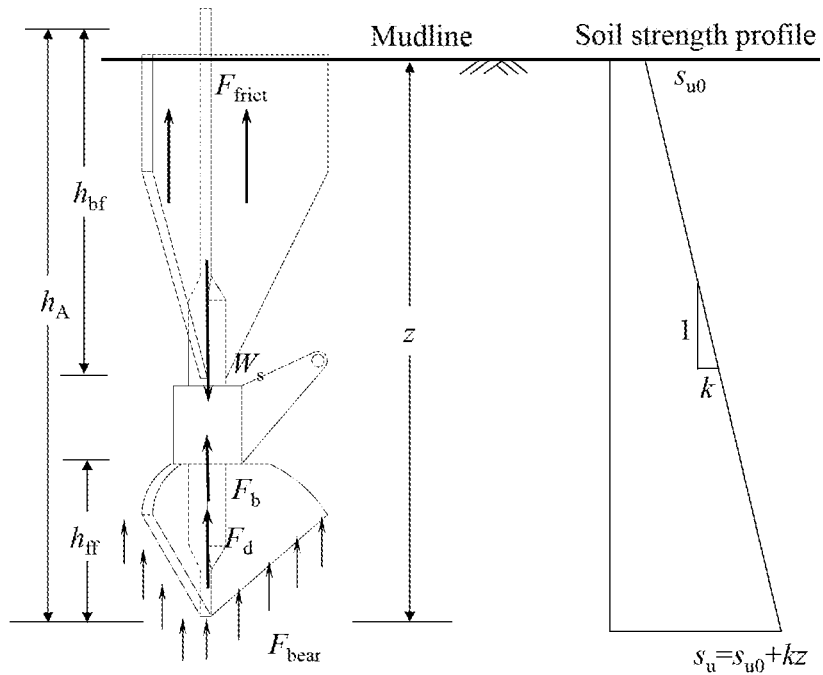
FIG. 6 Forces acting on the gravity installed plate anchor during its dynamic installation in seabed.

During anchor dynamic installation in the seabed, the forces acting on the gravity installed plate anchor are illustrated in FIG. 6. The forces include the anchor submerged weight in water, $W_s$ the soil buoyancy $F_b$, soil end bearing resistance, $F_{bear}$, soil frictional resistance, $F_{frict}$, and the drag force, $F_d$. In addition, the soil added mass force ($F_a$) on the anchor needs to be considered when the anchor decelerates in seabed.

(a) The end bearing resistance can be expressed in equation (6).

$$F_{bear} = N_c s_u A_t \qquad (6)$$

Where $N_c$ is the bearing capacity factor, which varies with the penetration depth and can be expressed in equation (7), $A_t$ is the anchor frontal area submerged in the soil.

$$N_c = (2+\pi)\left(1 + 0.189\frac{B}{L} - 0.108\left(\frac{B}{L}\right)^2 + c_1 \ln\left(1 + c_2\left(\frac{D}{B}\right)\right)\right) \qquad (7a)$$

$$\begin{cases} B/L \le 0.064 & c_1 = 5.599B/L + 0.337 \quad c_2 = 0.940 - 8.904B/L \\ B/L > 0.064 & c_1 = 0.697 - 0.022B/L \quad c_2 = 0.284 + 1.339B/L \end{cases} \qquad (7b)$$

where $c_1$ and $c_2$ are parameters in ten is of foundation aspect ratio, B/L, B is the foundation width, L is the foundation length, and D is the foundation embedment depth.

(b) The frictional resistance, $F_{frict}$, can be expressed in equation (8), where $\alpha$ is the coefficient of friction between anchor and soil, which is usually selected as the inverse of the soil sensitivity ($\alpha = 1/S_t$, $S_t$ is the soil sensitivity), $A_s$ is the anchor side area that is submerged in the soil.

$$F_{frict} = \alpha s_u A_s \qquad (8)$$

(c) The buoyancy is the submerged weight of the soil displaced by the anchor.

(d) The drag force on the anchor can be calculated by equation (9)

$$F_d = \tfrac{1}{2} C_d \rho_s A_p v_t^2 \qquad (9)$$

Where $\rho_s$ is the soil density, $v_t$ is the anchor penetration velocity at the moment of t.

(e) The added mass m* can be expressed in equation (10).

$$m^* = C_m m_{soil} \qquad (10)$$

Where $C_m$ is the added mass coefficient, $m_{soil}$ is the mass of the soil that is displaced by the anchor.

The anchor dynamic penetration in the soil can be expressed as equation (11).

$$(m_A + m^*)\frac{d^2 z}{dt^2} = W_s - F_b - R_f(F_{bear} + F_{frict}) - F_d \qquad (11)$$

Where z is the penetration depth from anchor tip to the mudline at the moment of t, $R_f$ is the strain rate parameter, which can be expressed as equation (12).

$$s_u = R_f s_{u,ref} = \left[1 + \eta\left(\frac{\dot{\gamma}}{\dot{\gamma}_{ref}}\right)^\beta\right]\frac{s_{u,ref}}{1+\eta} \qquad (12)$$

The soil strain rate effect is the variation of the soil undrained shear strength with the shear strain rate. In equation (12), $\eta$ is the viscous property factor, $\beta$ is the strain-rate property factor, $\dot{\gamma}$ is the shear strain rate, which is usually valued as the ratio of the anchor penetration velocity to the anchor equivalent diameter, $D_{eff}$, $s_{u,ref}$ is the soil reference shear strength at the reference shear strength rate $\dot{\gamma}_{ref}$.

Based on equations (6)~(12), the dynamic penetration of the gravity installed plate anchor and hybrid anchors in seabed under different impact velocities and soil strength profiles can be predicted. Therefore, it is beneficial to study the working efficiency of the anchor booster on the final penetration depth of the gravity installed plate anchor by using the theoretical model.

Substitute the parameters in Table 1 to equations (6)~(12), the final penetration depths of the gravity installed plate anchor and hybrid anchors under varied impact velocities and soil strength profiles can be predicted. Firstly, the dynamic penetration of the gravity installed plate anchor is predicted by the theoretical model, and the result is also depicted in FIG. 5. The soil strength gradient, coefficient of friction between anchor and soil, and the anchor impact velocity in the theoretical model are the same as that in the CFD numerical modeling. The comparison of the velocity-penetration depth curve between the theoretical model and the numerical modeling exhibits well consistence. The discrepancy of the final penetration depths between the theoretical prediction and the numerical modeling is justly 1.2%, indicating the prediction of the final penetration depth by the theoretical model is with high accuracy.

In the following, the effects of the coefficient of friction, the strength gradient and the impact velocity on the final penetration depth of the gravity installed plate anchor and hybrid anchors are investigated by the theoretical predicting model.

Figure 7A:
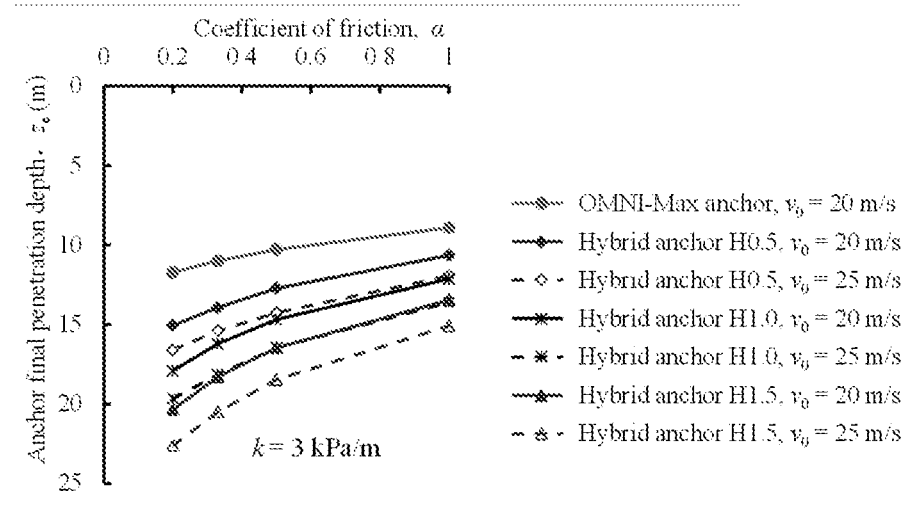
FIG. 7a Effect of coefficient of friction on the final penetration depth of the gravity installed plate anchor and hybrid anchors.
Figure 7B:
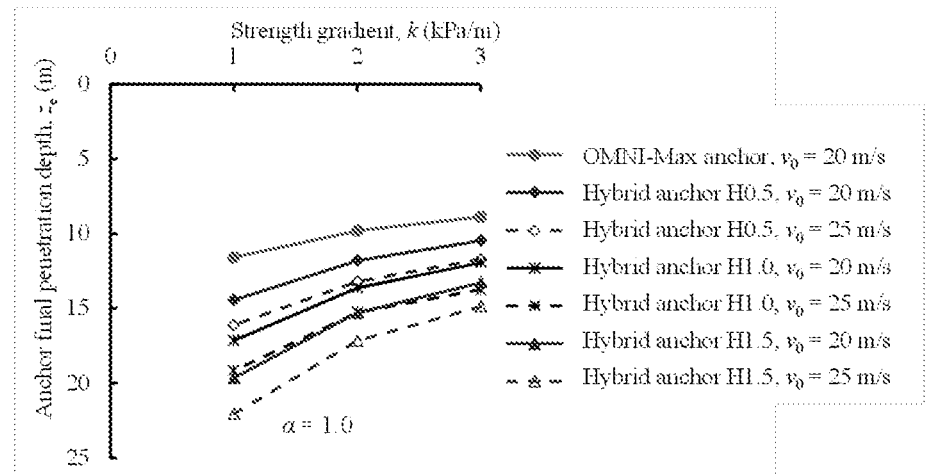
FIG. 7b Effect of soil strength gradient on the final penetration depth of the gravity installed plate anchor and hybrid anchors.

FIG. 7a shows that the final penetration depth of the gravity installed plate anchor is significantly increased by adding a booster. In addition, the final penetration depth increases with decreasing coefficient of friction and increasing booster weight. FIG. 7b shows that the anchor final penetration depth increases with decreasing soil strength gradient.

A simple case herein is used to demonstrate the working efficiency of the anchor booster on the final penetration depth of the gravity installed plate anchor. For gravity installed plate anchor with the impact velocity of 22.63 m/s, the corresponding penetration depth is 9.24 m with $s_u=2.4+3z$ kPa and $\alpha=1$. By the aid of a booster that is 1.0 times the anchor weight, the impact velocity can reach 30.9 m/s and the corresponding penetration depth is 14.48 m with $s_u=2.4+3z$ kPa and $\alpha=1$, which is 1.57 times of that of the gravity installed plate anchor. If $s_u=2.4+3z$ kPa and $\alpha=0.33$, the final penetration depth for the gravity installed plate anchor and the hybrid anchor H1.0 are 11.64 m and 18.81 m, respectively. This means that the final penetration depth of the hybrid anchor H1.0 is 1.62 times of that of the gravity installed plate anchor.

Generally, the benefits of the anchor booster are summarized as follows: with the same impact velocity, the final penetration depth of the hybrid anchor is increased by the added potential energy provided by the booster weight; the impact velocity of the hybrid anchor is increased, which ensures the anchor to penetrate further into the seabed. In practice, the anchor final penetration depth and thus the anchor holding capacity are increased by the aid of an

TABLE 1

Anchor and soil parameters

| | Parameter | value |
|---|---|---|
| gravity installed plate anchor | density, $\rho_A$ (kg/m³) | 7850 |
| | anchor mass, $m_A$ (kg) | 39000 |
| | anchor height, $h_A$(m) | 9.10 |
| | fluke width, $B_A$ (m) | 1.90 |
| | fluke thickness, $T_A$(m) | 0.20 |
| | tip fluke height, $h_{tf}$ (m) | 2.30 |
| | top fluke height, $h_{bf}$ (m) | 5.30 |
| | ring diameter, $D_a$ (m) | 1.10 |
| Soil | soil density, $\rho_s$ (kg/m³) | 1600 |
| | soil strength at the mudline, $s_{u0}$ (kPa) | 2.4 |
| | soilstrength gradient, k (kPa) | 1.0, 2.0, 3.0 |
| | viscous property factor, $\eta$ | 1 |
| | strain-rate property factor$\beta$ | 0.1 |
| | reference shear strain rate, $\dot{\gamma}_{ref}$ (s⁻¹) | 0.1 |
| | added mass coefficient, $C_m$ | 0.5 |
| | coefficient of friction,$\alpha$ | 1.0, 0.5, 0.33, 0.2 |
| Booster | shaft diameter, $D_p$ (m) | 1.10 |
| | booster mass, $m_p$ (kg) | 0.5 $m_A$, 1.0 $m_A$, 1.5 $m_A$ |

We claims:

1. An anchor booster to increase final penetration depth of a gravity installed plate anchor, wherein
    the anchor booster is comprised of a cylindrical shaft and three rear fins;
    the cylindrical shaft, which has an ellipsoidal tip and a contracted rear, is designed with a streamlined profile to decrease drag force during free fall in water and dynamic installation in seabed;
    the rear fins are inserted into slots which are separated by 120° in plane and are located at a rear of the anchor booster to improve directional stability of hybrid anchor, the hybrid anchor is the gravity installed plate anchor with an anchor booster;
    the anchor booster features a cylindrical slot at a tip of the anchor booster;
    a compatible cylindrical bar is fabricated at a tail of the gravity installed plate anchor;
    the anchor booster is attached to the tail of the gravity installed plate anchor by inserting the cylindrical bar into the cylindrical slot; and
    the cylindrical bar on the gravity installed plate anchor and the cylindrical slot on the anchor booster are fixed together by a shear pin.

2. The anchor booster according to claim 1, wherein the anchor booster is re-used for subsequent installation; a retrieval line is attached to a tail of the anchor booster; and
    after installation, the anchor booster is retrieved by pulling the retrieval line up, during which the shear pin is broken off and the gravity installed plate anchor is left to remain in seabed.

3. A method of the anchor booster to increase final penetration depth of the gravity installed plate anchor according to claim 2, the method comprising:
    (a) inserting the cylindrical bar of the gravity installed plate anchor into the cylindrical slot located at the tip of the anchor booster; then the gravity installed plate anchor and the anchor booster together are fixed by a shear pin; wherein shaft center of the gravity installed plate anchor is in line with shaft center of the anchor booster;
    (b) increasing terminal velocity of the gravity installed plate anchor by adding an anchor booster; for anchor free fall in water, terminal velocities for the gravity installed plate anchor and the hybrid anchor are expressed by equations (1) and (2), respectively:

$$V_T = \sqrt{\frac{(m_A - \rho_w \Theta_A)g}{0.5\rho_w A_p C_d}} \tag{1}$$

$$V'_T = \sqrt{\frac{(m_A + m_p - \rho_w(\Theta_A + \Theta_p))g}{0.5\rho_w A'_p C'_d}} \tag{2}$$

where $V_T$, $m_A$, $\Theta_A$, $A_p$ and $C_d$ are terminal velocity, mass, volume, frontal area and drag coefficient of the gravity installed plate anchor, $V'_T$, $A'_p$ and $C'_d$ are terminal velocity, frontal area and drag coefficient of the hybrid anchor, $m_p$ and $\Theta_p$ are mass and volume of the anchor booster, $\rho_w$ is water density and g is gravitational acceleration; frontal areas of $A_p$ and $A'_p$ are anchor projected areas perpendicular to anchor shaft; terminal velocity of the hybrid anchor is increased due to added weight provided by the anchor booster;

(c) increasing final penetration depth of the gravity installed plate anchor by adding the anchor booster; equilibrium equations characterizing dynamic installations of the gravity installed plate anchor and the hybrid anchor in seabed are expressed by equations (3) and (4):

$$m_A \frac{d^2z}{dt^2} = W_s - F_b - R_f(F_{bear} + F_{frict}) - F_d \tag{3}$$

$$(m_A + m_p)\frac{d^2z}{dt^2} = W_s + W_p - F'_b - R_f(F'_{bear} + F'_{frict}) - F'_d \tag{4}$$

where z is penetration depth from mudline to anchor tip at moment of t, $W_s$ and $W_p$ are submerged weight of the gravity installed plate anchor and the anchor booster in water, $F_b$, $F_{bear}$ and $F_{frict}$ are soil buoyancy, soil end bearing resistance, soil frictional resistance on the gravity installed plate anchor, $F'_b$, $F'_{bear}$, and $F'_{frict}$ are soil buoyancy, soil end bearing resistance, soil frictional resistance on the hybrid anchor; both kinetic and potential energies are increased with addition of an anchor booster, thus final penetration depth of the gravity installed plate anchor is increased; and (d) after installation of the hybrid anchor, retrieving the anchor booster by pulling the retrieval line up; when uplift load is beyond allowable force of the shear pin, the shear pin is broken off and the gravity installed plate anchor is left to remain in seabed; the anchor booster is re-usable for subsequent installation of gravity installed plate anchor.

* * * * *